United States Patent [19]

Dust et al.

[11] Patent Number: 5,002,863
[45] Date of Patent: Mar. 26, 1991

[54] NAPHTHOLACTAMTRIMETHINE DYES AND OPTICAL RECORDING MEDIUM CONTAINING SAME

[75] Inventors: Matthias Dust, Ludwigshafen; Peter Neumann, Mannheim; Michael Acker, Heidelberg-Kirchheim; Heidi Benthack-Thoms, Limburgerhof; Klaus-Dieter Schomann, Ludwigshafen; Harald Kuppelmaier, Heidelberg, all of Fed. Rep. of Germany

[73] Assignee: BASF Aktiengesellschaft, Ludwigshafen, Fed. Rep. of Germany

[21] Appl. No.: 272,431

[22] Filed: Nov. 17, 1988

[30] Foreign Application Priority Data

Nov. 17, 1987 [DE] Fed. Rep. of Germany ....... 3738911

[51] Int. Cl.$^5$ ................... G11B 7/24; C07D 209/90; C07D 403/14
[52] U.S. Cl. .................... 430/495; 430/270; 430/945; 544/300; 548/436
[58] Field of Search ........... 430/270, 495, 945; 544/300; 548/436

[56] References Cited

U.S. PATENT DOCUMENTS

| 4,009,165 | 2/1977 | Schefczik | 544/300 |
| 4,830,951 | 5/1989 | Dust et al. | 430/270 |
| 4,876,356 | 10/1989 | Dust et al. | 548/419 |

FOREIGN PATENT DOCUMENTS 102781  3/1984  European Pat. Off.
3608214 3/1979  Fed. Rep. of Germany.

*Primary Examiner*—Paul R. Michl
*Assistant Examiner*—Mark R. Buscher
*Attorney, Agent, or Firm*—Oblon, Spivak, McClelland, Maier & Newstadt

[57] ABSTRACT

Naphtholactamtrimethine dyes useful in optical recording media have the formula

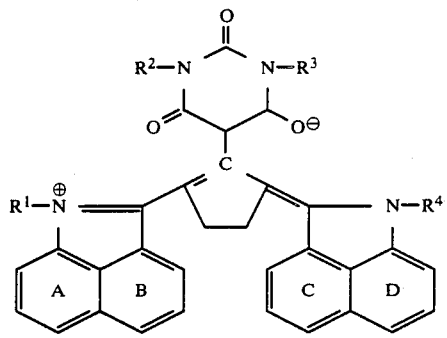

where $R^1$, $R^2$, $R^3$ and $R^4$ are identical or different and each is independently of the others $C_1$–$C_{22}$-alkyl, which may be substituted and/or interrupted by one or more oxygen atoms, one or more imino groups or one or more $C_1$–$C_4$-alkylimino groups, or is substituted or unsubstituted $C_5$–$C_7$-cycloalkyl or substituted or unsubstituted phenyl, and the rings A, B, C and D may each be substituted and/or benzofused.

6 Claims, No Drawings

NAPHTHOLACTAMTRIMETHINE DYES AND OPTICAL RECORDING MEDIUM CONTAINING SAME

The present invention relates to novel naphtholactamtrimethine dyes with a cyclopentenebarbituric acid derivative as a chain member and to an optical recording medium containing the novel naphtholactamtrimethine dyes.

Optical storage materials which on irradiation with high-energy radiation, for example laser light, undergo local alterations in state and hence alterations in their optical properties are known. These thermally induced alterations in state can be used for information and data recording.

The recording materials used for this method of information storage are for example thin layers of metals (including alloys) or dyes. Dyes are preferable to metallic layers because of higher stability in the layer.

In optical storage systems which are suitable for operation with semiconductor injection lasers emitting within the wavelength range from 750 to 950 nm, suitable organic IR dyes are for example phthalocyanine compounds, methine dyes and squaric acid derivatives.

It is an object of the present invention to provide novel methine dyes which are suitable for preparing optical recording media. The dyes should have favorable application properties, in particular a high molar absorbance and ready solubility in organic solvents.

EP-A-102,781 discloses cyanine dyes where the bridge member is a cyclopentenebarbituric acid derivative. The terminal heterocyclics considered therein are for example benzothiazole and indolenine derivatives.

However, prior art dyes frequently still have defects in their range of application properties.

We have found that the abovementioned object is achieved with novel naphtholactamtrimethine dyes of the formula I

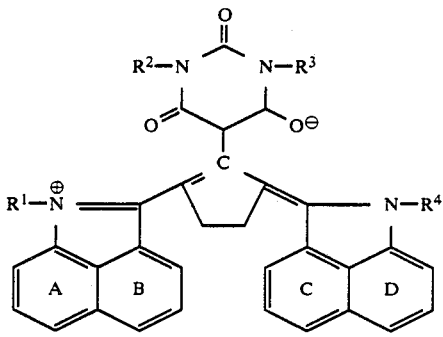

where $R^1$, $R^2$, $R^3$ and $R^4$ are identical or different and each is independently of the others $C_1$–$C_{22}$-alkyl, which may be substituted and/or interrupted by one or more oxygen atoms, one or more imino groups or one or more $C_1$–$C_4$-alkylimino groups, or is substituted or unsubstituted $C_5$–$C_7$-cycloalkyl or substituted or unsubstituted phenyl, and the rings A, B, C and D may each be substituted and/or benzofused.

All the alkyl groups appearing in the abovementioned radicals can be not only straight-chain but also branched.

If $R^1$, $R^2$, $R^3$ and/or $R^4$ are each substituted $C_1$–$C_{22}$-alkyl which may be interrupted by one or more oxygen atoms, one or more imino groups or one or more $C_1$–$C_4$-alkylimino groups, suitable substituents are for example phenyl, halogen, hydroxyl, C1-C4-alkanoyl, carboxyl, $C_1$–$C_4$-alkanoylamino, $C_1$–$C_4$-alkoxycarbonyl, $C_1$–$C_4$-alkoxycarbonylamino or N-($C_1$–$C_4$-alkyl)anilino.

If $R^1$, $R^2$, $R^3$ and/or $R^4$ are each substituted $C_5$–$C_7$-cycloalkyl, suitable substituents are for example $C_1$–$C_4$-alkyl or halogen, in particular chlorine or bromine.

If substituted phenyl groups appear in the naphtholactamtrimethine dyes of the formula I, suitable substituents are for example $C_1$–$C_4$-alkyl, $C_1$–$C_4$-alkoxy, halogen, in particular chlorine or bromine, or C1-C4-dialkylamino.

If alkyl groups interrupted by oxygen, imino or $C_1$–$C_4$-alkylimino appear in the naphtholactamtrimethine dyes of the formula I, preference is given to those dyes where these alkyl groups are interrupted by from 1 to 3 oxygen atoms or by from 1 to 3 imino or $C_1$–$C_4$-alkylimino groups.

$R^1$, $R^2$, $R^3$ and $R^4$ are each for example methyl, ethyl, propyl, isopropyl, butyl, isobutyl, sec-butyl, tert-butyl, pentyl, isopentyl, neopentyl, tert-pentyl, hexyl, 2-methylpentyl, heptyl, octyl, 2-ethylhexyl, isooctyl, nonyl, isononyl, decyl, isodecyl, undecyl, dodecyl, tridecyl, isotridecyl, tetradecyl, pentadecyl, hexadecyl, heptadecyl, octadecyl, nonadecyl, icosyl, henicosyl, docosyl (the designations isooctyl, isononyl, isodecyl and isotridecyl are trivial meanings from oxo alcohols [cf. Ullmann's Enzyklopä die der technischen Chemie, 4th edition, Volume 7, pages 215 to 217 and Volume 11, pages 435 and 436]), benzyl, 1- or 2-phenylethyl, trifluoromethyl, trichloromethyl, 1,1,1-trifluoroethyl, heptafluoropropyl, 2-methoxyethyl, 2-ethoxyethyl, 2-propoxyethyl, 2-butoxyethyl, 2-benzyloxyethyl, 2-ethoxypropyl, 3-ethoxypropyl, 3-benzyloxypropyl, 3,6-dioxaheptyl, 3,6-dioxaoctyl, 3,6-dioxadecyl, 3,6,9-trioxadecyl, 4-oxa-6-ethyldecyl, 3,6-dioxa-7-phenylheptyl, propan-2-on-1-yl, butan-3-on-1-yl, butan-3-on-2-yl, 2-ethylpentan-3-on-1-yl, carboxymethyl, 2-carboxyethyl, 3-carboxypropyl, 4-carboxybutyl, 5-carboxypentyl, 4-carboxy-3-oxabutyl, acetylaminomethyl, 2-(acetylamino)ethyl, 2-(propionylamino)ethyl, 2-(butyrylamino)ethyl, ethoxycarbonylmethyl, 2-(ethoxycarbonyl)ethyl, 2- or 3-(methoxycarbonyl)propyl, ethoxycarbonylaminomethyl, 2-(ethoxycarbonylamino)ethyl, N-methylanilinomethyl, 2-(N-isopropylanilino)ethyl, 2-hydroxyethyl, 2-hydroxypropyl, 3-hydroxypropyl, 2-hydroxybutyl, 4-hydroxybutyl, 8-hydroxyoctyl, 3-azabutyl, 3-aza-3-methylbutyl, 3-aza-3-ethylpentyl, 4-aza-4-methylpentyl, 3-azahexyl, 3-azaheptyl, 3-aza-3-butylheptyl, 3-aza-3-(2-hydroxyethyl)heptyl, cyclopentyl, cyclohexyl, cycloheptyl, 3-methylcyclopentyl, 4-ethylcyclohexyl, 2,3-dichlorocyclohexyl, phenyl, 4-methylphenyl, 4-isopropylphenyl, 4-methoxyphenyl, 2,4-dimethoxyphenyl, 2-chloro-phenyl, 4-bromophenyl or 4-dimethylaminophenyl.

If the rings A, B, C and/or D are substituted and possibly benzofused, suitable substituents are for example the radicals mentioned under $R^1$, $R^2$, $R^3$ and $R^4$ and also for example halogen, in particular chlorine or bromine, $C_1$–$C_{22}$-alkoxy, which may be interrupted by one or more oxygen atoms and/or substituted by phenyl, nitro, cyano, $C_1$–$C_4$-monoalkyl- or -dialkylamino, 1-azacycloalkyl, $C_1$–$C_{20}$-alkylthio, $C_1$–$C_4$-alkylsulfonyl, $C_1$–$C_4$-alkoxysulfonyl, substituted or unsubstituted phenylsulfonyl, hydroxysulfonyl, anilino, N-($C_1$–$C_4$-alkyl)anilino, $C_1$–$C_4$-alkanoyl, $C_1$–$C_4$-alkanoylamino, $C_1$–$C_4$-alkoxycarbonyl, $C_1$–$C_4$-alkoxycarbonylamino, carbamoyl, $C_1$–$C_4$-monoalkyl- or -dialkylcarbamoyl, sulfamoyl, $C_1$–$C_4$-monoalkyl- or -dialkylsulfamoyl, ureido, $C_1$–$C_4$-alkyl-substituted ureido, phenoxy, phenylthio or the radical

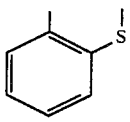

1-Azacycloalkyl radicals are for example from five to seven-membered saturated nitrogen heterocyclics which are bonded via the nitrogen atom and may additionally contain further hetero atoms. Specific examples are

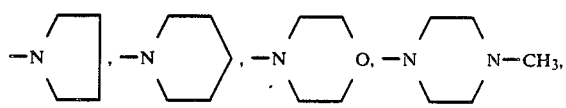

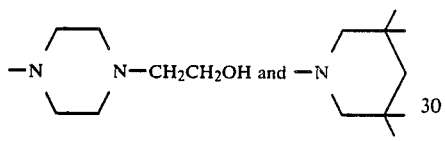

For examples of $C_1$–$C_{22}$-alkoxy radicals which may be interrupted by oxygen atoms and/or substituted by phenyl, reference is made to the corresponding examples of alkyl radicals mentioned under from $R^1$ to $R^4$.

The following substitution patterns on the naphtholactam system are mentioned by way of example:

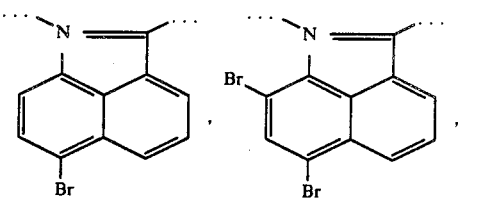

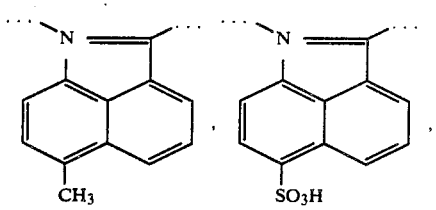

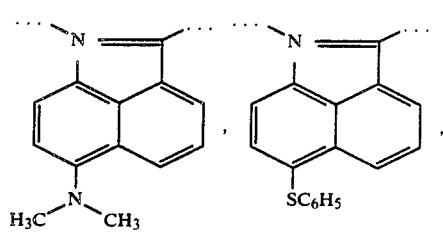

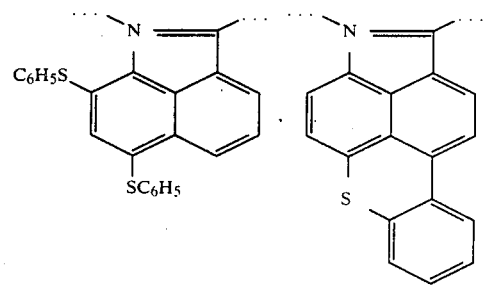

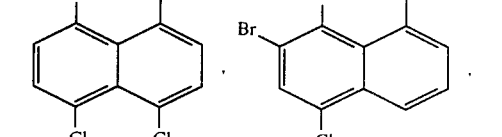

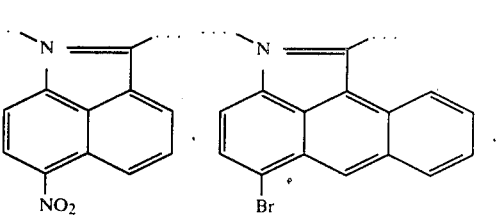

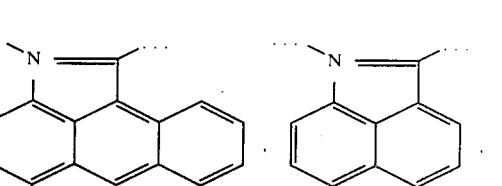

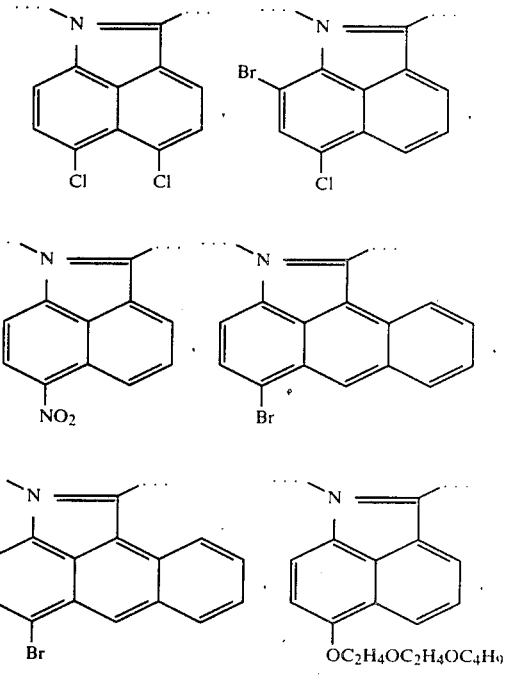

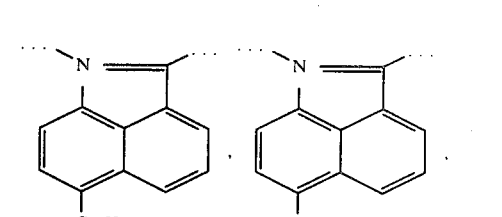

-continued

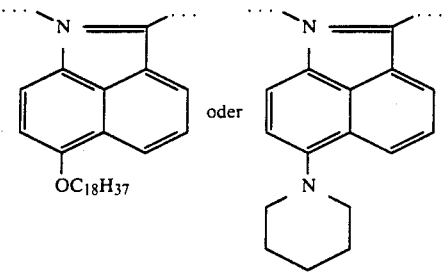
oder
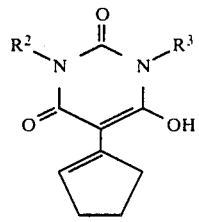

Preference is given to naphtholactamtrimethine dyes of the formula I where $R^1$ and $R^4$ are each independently of the other $C_1$–$C_{12}$-alkyl which may be interrupted by one or two oxygen atoms and/or substituted by phenyl, and $R^2$ and $R^3$ are each independently of the other $C_1$–$C_{20}$-alkyl which may be interrupted by one or two oxygen atoms or one or two imino groups and/or substituted by hydroxyl, carboxyl or $C_1$–$C_4$-alkanoyl, and the rings A, B, C and D are unsubstituted or substituted by $C_1$–$C_{12}$-alkyl, $C_1$–$C_{12}$-alkoxy, which may be interrupted by one or more oxygen atoms and/or substituted by phenyl, phenyl, $C_1$–$C_{10}$-alkylthio, cyano, $C_1$–$C_{12}$-monoalkyl- or -dialkylamino, 1-azacycloalkyl, chlorine, bromine, hydroxysulfonyl, phenylthio or the radical

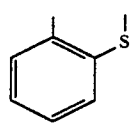

and/or benzofused.

Particular preference is given to naphtholactamtrimethine dyes of the formula I where $R^1$ and $R^4$ are each independently of the other $C_1$–$C_4$-alkyl and $R^2$ and $R^3$ are each independently of the other $C_1$–$C_{10}$-alkyl which may be interrupted by one or two oxygen atoms or an imino group and/or substituted by hydroxyl or carboxyl, and the rings A, B, C and D are each unsubstituted.

The dyes according to the invention are prepared by condensing a naphtholactam compound of the formula II

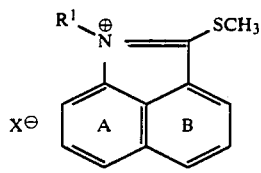

where $R^1$, A and B are each as defined above and X is an anion, for example chloride, bromide or iodide, with compounds of the formula III

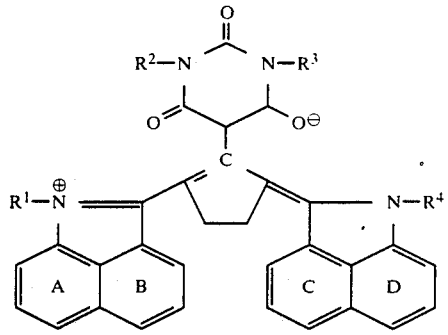

where $R^2$ and $R^3$ are each as defined above, in an inert organic solvent, for example ethanol, propanol, butanol or a mixture thereof, in the presence of an organic base, for example triethylamine, pyridine or morpholine, at from 20° to 120° C. In this reaction, the molar ratio of II:III is in general of from 2:1 to 4:1. Per mole of naphtholactam II it is the rule to use from 1 to 10 moles of organic base.

The starting naphtholactam compounds of the formula II and barbituric acid derivatives of the formula III are known or can be prepared in a manner known per se.

The naphtholactamtrimethine dyes of the formula I have a high molar absorption coefficient within the range from 700 to 950 nm. They are readily soluble in organic solvents and/or thermoplastics or crosslinked plastics.

The present invention further relates to an optical recording medium containing a base and a radiation-sensitive thin coating film containing a dye with or without a binder, wherein the dye is a naphtholactamtrimethine dye of the formula I where $R^1$, $R^2$, $R^3$ and $R^4$ are identical or different and each is independently of the others $C_1$–$C_{22}$-alkyl, which may be substituted and/or interrupted by one or more oxygen atoms, one or more imino groups or one or more $C_1$–$C_4$-alkylimino groups, or is substituted or unsubstituted $C_5$–$C_7$-cycloalkyl or substituted or unsubstituted phenyl, and the rings A, B, C and D may each be substituted and/or benzofused.

Preference is given to an optical recording medium containing a naphtholactamtrimethine dye of the formula I where $R^1$ and $R^4$ are each independently of the other $C_1$–$C_{12}$-alkyl which may be interrupted by one or two oxygen atoms and/or substituted by phenyl, and $R^2$ and $R^3$ are each independently of the other $C_1$–$C_{20}$-alkyl which may be interrupted by one or two oxygen atoms or one or two imino groups and/or substituted by hydroxyl, carboxyl or $C_1$–$C_4$-alkanoyl, and the rings A, B, C and D are unsubstituted or substituted by $C_1$–$C_{12}$-alkyl, $C_1$–$C_{12}$-alkoxy, which may be interrupted by one or two oxygen atoms and/or substituted by phenyl, phenyl, $C_1$–$C_{10}$-alkylthio, cyano, $C_1$–$C_{12}$-monoalkyl- or -dialkylamino, 1-azacycloalkyl, chlorine, bromine, hydroxysulfonyl, phenylthio or the radical

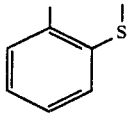

and/or benzofused.

Particular preference is given to an optical recording medium containing a naphtholactamtrimethine dye of the formula I where $R^1$ and $R^4$ are each independently of the other $C_1$–$C_4$-alkyl and $R^2$ and $R^3$ are each independently of the other $C_1$–$C_{10}$-alkyl which may be interrupted by one or two oxygen atoms or an imino group and/or substituted by hydroxyl or carboxyl, and the rings A, B, C and D are each unsubstituted.

The construction of the recording media is known per se.

Suitable bases are for example glass plates or disks or plastics plates or disks, in particular plates or disks made of polymethyl methacrylate, polystyrene, polystyrene copolymers, polyvinyl chloride, polymethylpentene or polycarbonate, which may bear tracking grooves.

The base may have the form of a tape, a square or rectangular plate or preferably a round disk, in which case the disks 10 or 13 cm in diameter conventional in laser-optical recording materials are preferred.

If the laser-optical recording medium contains a binder, possible binders are either radiation- or heat-curable resins, for example photopolymers, silicone resins or epoxy resins, or thermoplastics.

Preference is given to thermoplastics having no or only a very small crystalline domain and glass temperatures of $>35°$ C., in particular $>75°$ C. In addition, the binder, for example the resin or thermoplastic, must be highly compatible with the naphtholactamtrimethine dye of the formula I. Suitable are for example water-insoluble binders of high dissolving power for naphtholactamtrimethine dyes, such as (meth)acrylate polymers or copolymers, polystyrene homopolymers or copolymers, polyvinylcarbazole, polyvinyl ester copolymers, polyvinyl chloride or cellulose esters.

There may also be present a reflective layer, situated between the radiation-sensitive layer and the base, so that the incident light passing through the colored layer, unless it is absorbed, is reflected at the reflector layer and passes once more through the colored layer.

Illumination may also take place through a transparent substrate, in which case a suitable arrangement for the layers is substrate/radiation-sensitive layer/any reflector layer.

Suitable light-reflecting materials are for example aluminum, rhodium, gold, tin, lead, bismuth, copper or dielectric mirrors. The light-reflecting layer should ideally be sufficiently thick to reflect all the light used for recording or scanning.

Mirrors of low thermal conductivity are advantageous for this purpose. The base or the light-reflecting layer must have an optically smooth, planar surface which is such that the absorbing layer is firmly adherent thereto. In order that surface quality and adhesion phenomena may be affected favorably, the base and/or the reflector may be provided with a planarizing layer of a thermosetting or thermoplastic material.

If the optical recording medium has a metallic reflector, the metallic reflection layer is preferably applied in the conventional manner, for example by vacuum vapor deposition or by applying suitable metal foils to the base.

The radiation-sensitive layer is preferably applied by spincoating dissolved or dispersed dye in the presence of binders. Alternatively, knife-coating or dip-coating are suitable for preparing the layers.

To apply the absorption layers from solution, a suitable solvent, such as methylene chloride, chloroform, carbon tetrachloride, acetone, methyl ethyl ketone, cyclohexanone, toluene, acetonitrile, ethyl acetate, methanol or a mixture thereof, is used to prepare a solution or, as the case may be, a dispersion of the dye or dye mixture and the binder.

The dye preparation is then applied by knife- or dip-coating, but preferably by spincoating, to a previously cleaned or pretreated (subbed) substrate and the layer dried or cured in air. The film may also be dried or cured under reduced pressure, at an elevated temperature or, where appropriate, with radiation.

Depending on the structure of the system, first the radiation-sensitive layer is applied and then the reflector, or vice versa. The application of intermediate and protective layers or of a reflecting layer may in certain circumstances be dispensed with.

If intermediate layers cannot be dispensed with, it is necessary to select the thickness of the intermediate layers in such a way, having regard to the refractive index of the material to be used and the laser light wavelength to be used, that no interference problems can arise.

If the radiation-sensitive layer does not have sufficient mechanical stability, it can be coated with a transparent protective layer. Suitable for this purpose are a number of polymers, for example fluorinated polymers, which can be applied by spincoating, knife-coating or dip-coating with dissolved polymers or by vacuum vapor deposition.

If the system (data store) is constructed of two identical or different recording media in the form of a sandwich, a protective layer becomes dispensable. Aside from greater mechanical and rotation dynamics stability, a sandwich construction offers the advantage of doubled storage capacity.

The recording medium according to the invention has a very high absorption at the semiconductor laser wavelength of from about 750 to 950 nm. The radiation-sensitive layer can be applied to a light-reflecting layer in such a way as to produce a smooth absorption layer of high optical quality and a favorable threshold energy.

The novel recording media are very stable to atmospheric effects and daylight. They are writable and readable with a semiconductor laser. Owing to the high light absorption of the dyes, the novel recording media are here very sensitive to the light of the GaAlAs semiconductor laser.

The heat produced in the course of the absorption of laser light causes the thermoplastic to flow radially outward and thus leads to the formation of sharp-edged holes, which is responsible for an excellent signal-to-noise ratio being obtained.

The following examples will illustrate the invention in more detail:

A. Preparation of dyes

EXAMPLE 1

2 g (6 mmol) of 1-methyl-2-methylmercaptobenzo-[c,d]indolium iodide and 0.65 g (3 mmol) of 5-(cyclopent-1-en-1-yl)-1,3-dimethylbarbituric acid were refluxed in 35 ml of absolute ethanol together with 1.7 mmol of triethylamine for 1 hour. After the reaction had ended, the mixture was cooled in an ice bath for several hours, and the dye was then filtered off with suction. Further dye 10 was obtained from the mother liquor by adding 50 ml of ether. The crude dye thus obtained was washed with acetone and recrystallized from methanol. Yield: 1 g of dye of the formula

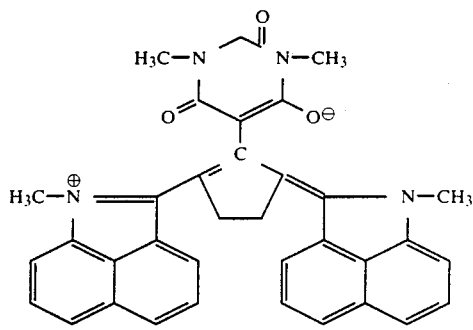

Absorption peak: 820 nm (CH$_2$Cl$_2$).

EXAMPLES 2 TO 8

The dyes listed in the Table below were prepared by a method similar to that of Example 1. The solvent used in the determination of the absorption peak is reported in each case.

| Example No. | Dye | λmax [nm] |
|---|---|---|
| 2 | (structure shown) | 828 (DMF) |
| 3 | (structure shown) | 810 (THF) |
| 4 | (structure shown) | 810 (THF) |

-continued
| | | |
|---|---|---|
| 5 | 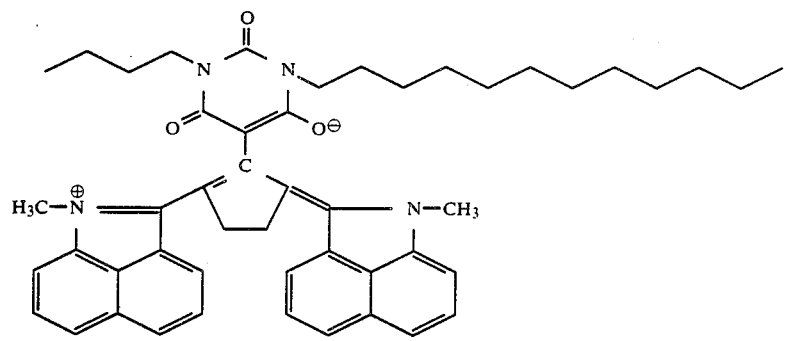 | 812 (THF) |
| 6 | 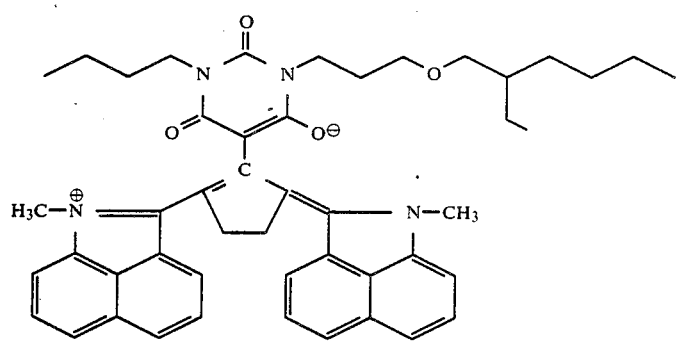 | 819 (CH$_2$Cl$_2$) |
| 7 | 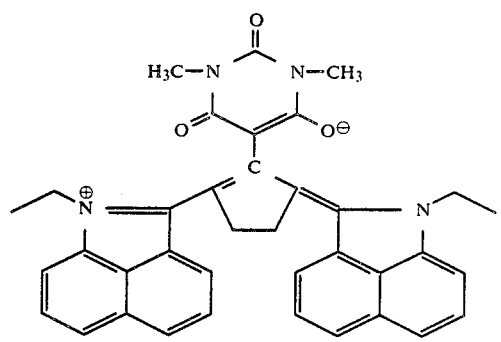 | 818 (CH$_2$Cl$_2$) |
| 8 | 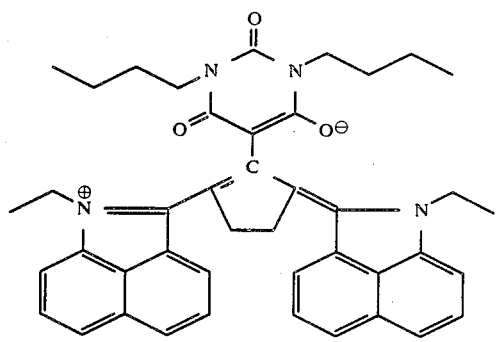 | 818 (CH$_2$Cl$_2$) |
The dyes of the formula -continued

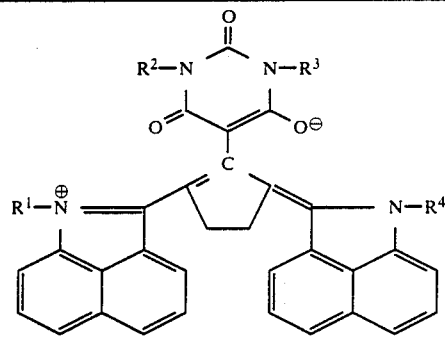

listed below were obtained in a similar manner:

| Ex. No. | R¹ | R² | R³ | R⁴ |
|---|---|---|---|---|
| 9 | CH₃ | (CH₂)₂NHCH₃ | (CH₂)₂NHCH₃ | CH₃ |
| 10 | C₂H₅ | (CH₂)₂NHCH₃ | (CH₂)₂NHCH₃ | C₂H₅ |
| 11 | C₂H₅ | (CH₂)₂NH(CH₂)₂CH₃ | (CH₂)₂NH(CH₂)₂CH₃ | C₂H₅ |
| 12 | C₂H₅ | (CH₂)₂N(CH₂CH₃)(CH₂CH₃) | (CH₂)₂N(CH₂CH₃)(CH₂CH₃) | C₂H₅ |
| 13 | CH₃ | (CH₂)₂N((CH₂)₃CH₃)((CH₂)₃CH₃) | (CH₂)₂N((CH₂)₃CH₃)((CH₂)₃CH₃) | CH₃ |
| 14 | CH₃ | (CH₂)₂NH(CH₂)₂N(CH₂CH₃)(CH₂CH₃) | (CH₂)₂NH(CH₂)₂N(CH₂CH₃)(CH₂CH₃) | CH₃ |
| 15 | C₂H₅ | (CH₂)₂NH(CH₂)₂N(CH₂CH₃)(CH₂CH₃) | (CH₂)₂NH(CH₂)₂N(CH₂CH₃)(CH₂CH₃) | C₂H₅ |
| 16 | CH₃ | (CH₂)₂NH(CH₂)₂N((CH₂)₃CH₃)((CH₂)₃CH₃) | (CH₂)₂NH(CH₂)₂N((CH₂)₃CH₃)((CH₂)₃CH₃) | CH₃ |
| 17 | C₂H₅ | (CH₂)₂NH(CH₂)₂N((CH₂)₃CH₃)((CH₂)₃CH₃) | (CH₂)₂NH(CH₂)₂N((CH₂)₃CH₃)((CH₂)₃CH₃) | C₂H₅ |

B. Preparation of optical recording medium 0.099 g of a copolymer of 70% of methyl methacrylate and 30% of methacrylic acid was dissolved in 0.302 g of ethanol. 0.23 g of dye No. 6 was added, followed by 6.39 g of ethanol and 1.18 g of diacetone alcohol. The solution was stirred for 1 hour and filtered, and the filtrate was spuncoated at 2000 r.p.m. onto a polymethyl methacrylate substrate.

The layer was homogeneous and without flaws. It had a thickness of 133 nm and a very wide absorption band. At 830 nm the molar absorbance was 0.5.

Using an AlGaAs laser ($\lambda = 820$ nm) mounted on a turntable, individual holes about 1 μm in size were written into the active layer. The sensitivity of the layer was better than 1 nJ/hole. On reading back the dots, an excellent signal-to-noise ratio was found.

We claim:

1. A naphtholactamtrimethine dye of the formula I

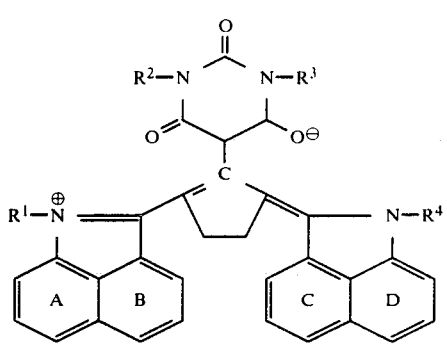

where $R^1$, $R^2$, $R^3$ and $R^4$ are identical or different and each is independently of the others $C_1$–$C_{22}$-alkyl, which may be substituted and/or interrupted by one or more oxygen atoms, one or more imino groups or one or more $C_1$–$C_4$-alkylimino groups, or is substituted or unsubstituted $C_5$–$C_7$-cycloalkyl or substituted or unsubstituted phenyl, and the rings A, B, C and D may each be substituted and/or benzofused.

2. A naphtholactamtrimethine dye as claimed in claim 1, wherein $R^1$ and $R^4$ are each independently of the other $C_1$–$C_{12}$-alkyl which may be interrupted by one or two oxygen atoms and/or substituted by phenyl, and $R^2$ and $R^3$ are each independently of the other $C_1$–$C_{20}$-alkyl which may be interrupted by one or two oxygen atoms or one or two imino groups and/or substituted by hydroxyl, carboxyl or $C_1$–$C_4$-alkanoyl, and the rings A, B, C and D are unsubstituted or substituted by $C_1$–$C_{12}$-alkyl, $C_1$–$C_{12}$-alkoxy, which may be interrupted by one or two oxygen atoms and/or substituted by phenyl, phenyl, $C_1$–$C_{10}$-alkylthio, cyano, $C_1$–$C_{12}$-monoalkyl-or -dialkylamino, 1-azacycloalkyl, chlorine, bromine, hydroxysulfonyl, phenylthio or the radical

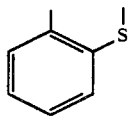

and/or benzofused.

3. A naphtholactammethine dye as claimed in claim 1, wherein $R^1$ and $R^4$ are each independently of the other $C_1$–$C_4$-alkyl and $R^2$ and $R^3$ are each independently of the other $C_1$–$C_{10}$-alkyl which may be interrupted by one or two oxygen atoms or an imino group and/or substituted by hydroxyl or carboxyl, and the rings A, B, C and D are each unsubstituted.

4. An optical recording medium containing a base and a radiation-sensitive coating film containing a dye with or without a binder, wherein the dye is a naphtholactamtrimethine dye of the formula I

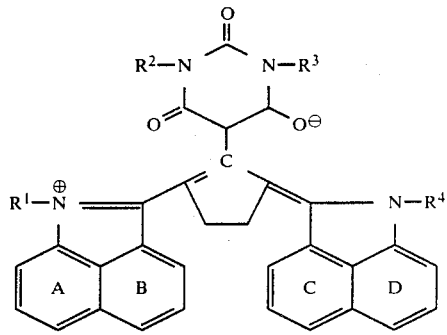

where $R^1$, $R^2$, $R^3$ and $R^4$ are identical or different and each is independently of the others $C_1$–$C_{22}$-alkyl, which may be substituted and/or interrupted by one or more oxygen atoms, one or more imino groups or one or more $C_1$–$C_4$-alkylimino groups, or is substituted or unsubstituted $C_5$–$C_7$-cycloalkyl or substituted or unsubstituted phenyl, and the rings A, B, C and D may each be substituted and/or benzofused.

5. An optical recording medium as claimed in claim 4, wherein $R^1$ and $R^4$ are each independently of the other $C_1$–$C_{12}$-alkyl which may be interrupted by one or two oxygen atoms and/or substituted by phenyl, and $R^2$ and $R^3$ are each independently of the other $C_1$–$C_{20}$-alkyl which may be interrupted by one or two oxygen atoms or one or two imino groups and/or substituted by hydroxyl, carboxyl or $C_1$–$C_4$-alkanoyl, and the rings A, B, C and D are unsubstituted or substituted by $C_1$–$C_{12}$-alkyl, $C_1$–$C_{12}$-alkoxy, which may be interrupted by one or two oxygen atoms and/or substituted by phenyl, phenyl, $C_1$–$C_{10}$-alkylthio, cyano, C1-C12-monoalkyl- or -dialkylamino, 1-azacycloalkyl, chlorine, bromine, hydroxysulfonyl, phenylthio or the radical

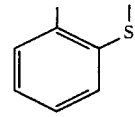

and/or benzofused.

6. An optical recording medium as claimed in claim 4, wherein $R^1$ and $R^4$ are each independently of the other $C_1$–$C_4$-alkyl, $R^2$ and $R^3$ are each independently of the other $C_1$–$C_{10}$-alkyl which may be interrupted by one or two oxygen atoms or an imino group and/or substituted by hydroxyl or carboxyl, and the rings A, B, C and D are each unsubstituted.

* * * * *